US008966476B2

(12) United States Patent
Doan et al.

(10) Patent No.: US 8,966,476 B2
(45) Date of Patent: Feb. 24, 2015

(54) PROVIDING OBJECT-LEVEL INPUT/OUTPUT REQUESTS BETWEEN VIRTUAL MACHINES TO ACCESS A STORAGE SUBSYSTEM

(75) Inventors: Don Vinh Doan, Spring, TX (US); Thomas S. Lawler, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 629 days.

(21) Appl. No.: 12/995,032

(22) PCT Filed: May 28, 2008

(86) PCT No.: PCT/US2008/064948
§ 371 (c)(1),
(2), (4) Date: Nov. 29, 2010

(87) PCT Pub. No.: WO2009/145764
PCT Pub. Date: Dec. 3, 2009

(65) Prior Publication Data
US 2011/0078682 A1 Mar. 31, 2011

(51) Int. Cl.
*G06F 9/455* (2006.01)
*G06F 12/00* (2006.01)

(52) U.S. Cl.
CPC ................... *G06F 9/45537* (2013.01)
USPC ............................................. 718/1; 711/114

(58) Field of Classification Search
CPC .................................................... G06F 9/5077
See application file for complete search history.

(56) References Cited

U.S. PATENT DOCUMENTS

| 5,459,839 | A * | 10/1995 | Swarts et al. ................. 710/112 |
| 6,453,392 | B1 | 9/2002 | Flynn |
| 6,681,267 | B2 | 1/2004 | Ohmura et al. |
| 6,718,434 | B2 * | 4/2004 | Veitch et al. ................... 711/114 |
| 8,307,359 | B1 * | 11/2012 | Brown et al. ...................... 718/1 |
| 2003/0154246 | A1* | 8/2003 | Ollikainen ..................... 709/203 |
| 2003/0188109 | A1* | 10/2003 | Yamasaki ..................... 711/147 |
| 2004/0111548 | A1 | 6/2004 | Arimilli |
| 2005/0076185 | A1* | 4/2005 | Bhatti ........................... 711/206 |
| 2006/0174087 | A1 | 8/2006 | Hashimoto et al. |
| 2006/0265525 | A1 | 11/2006 | Boyd et al. |
| 2007/0100893 | A1* | 5/2007 | Sanders ......................... 707/200 |
| 2007/0136554 | A1 | 6/2007 | Biran et al. |
| 2008/0077765 | A1 | 3/2008 | Illikkal |
| 2008/0209090 | A1* | 8/2008 | Kano et al. .................... 710/105 |

FOREIGN PATENT DOCUMENTS

CN 101019120 A 8/2007

OTHER PUBLICATIONS

International Search Report and Written Opinion, dated Feb. 20, 2009, 10 pages.

(Continued)

*Primary Examiner* — Meng An
*Assistant Examiner* — Tammy Lee
(74) *Attorney, Agent, or Firm* — Trop, Pruner & Hu, P.C.

(57) ABSTRACT

A system includes a storage subsystem and a first virtual machine to manage access of the storage subsystem. A second virtual machine is coupled by a virtual machine channel to the first virtual machine. The second virtual machine has software to issue a object-level input/output (I/O) request to the first virtual machine over the virtual machine channel to access data in the storage subsystem.

17 Claims, 2 Drawing Sheets

(56) References Cited

OTHER PUBLICATIONS

ISR-WO PCT/US2008/064948, HP reference 82242587, Feb. 20, 2009, 10 pps.
Paul Barham et al., Xen and the Art of Virtualization, SOSP 2003 (14 pages).
Sivathanu et al., Life or Death at Block-Level, Appears in the Sixth Symposium on Operating Systems Design and Implementation (OSDI 2004) (16 pages).
Proceedings of the Linux Symposium Jul. 23-26, 2003 Ottawa, Ontario, Canada (558 pages).
Mesnier et al., Storage Area Networking—Object-Based Storage, IEEE, Aug. 2003 (7 pages).
Mustafa Uysal et al., Using MEMS-based Storage in Disk Arrays, Usenix Association, Proceedings of Fast '03: 2nd USENIX Conference on File and Storage Technologies (14 pages).
ZFS: the last word in file systems, 2004 (3 pages).

* cited by examiner

PROVIDING OBJECT-LEVEL INPUT/OUTPUT REQUESTS BETWEEN VIRTUAL MACHINES TO ACCESS A STORAGE SUBSYSTEM

CROSS-REFERENCE TO RELATED APPLICATION

This application is a national stage application under 35 U.S.C. §371 of PCT/US2008/064948, filed May 28, 2008.

BACKGROUND

Virtual machines can be provided in a computer to enhance flexibility and performance. A virtual machine typically refers to some arrangement of components (software and/or hardware) for virtualizing or emulating an actual computer, where the virtual machine can include an operating system (referred to as a "guest" operating system) and software applications. Virtual machines can allow different operating systems to be deployed on the same computer, such that applications written for different operating systems can be executed in different virtual machines (that contain corresponding operating systems) in the same computer.

In a virtualized environment that includes virtual machines, a virtual machine monitor (VMM), also referred to as a hypervisor, manages the sharing (by virtual machines) of physical resources of an underlying physical machine. Virtualized environments have also been implemented in storage systems. In such a virtualized environment, virtual machines are provided with respective engines for accessing storage devices of the storage system. For example, a virtual machine can be provided with an engine that implements a RAID (redundant array of inexpensive disks) architecture.

Conventionally, in a system having multiple virtual machines with different guest operating systems, multiple different RAID engines may have to be provided for the different operating systems. However, this is inefficient since software development of RAID engines is made more complex due to dependencies on different operating systems.

BRIEF DESCRIPTION OF THE DRAWINGS

Some embodiments of the invention are described with respect to the following figures.

DETAILED DESCRIPTION

Figure 1:
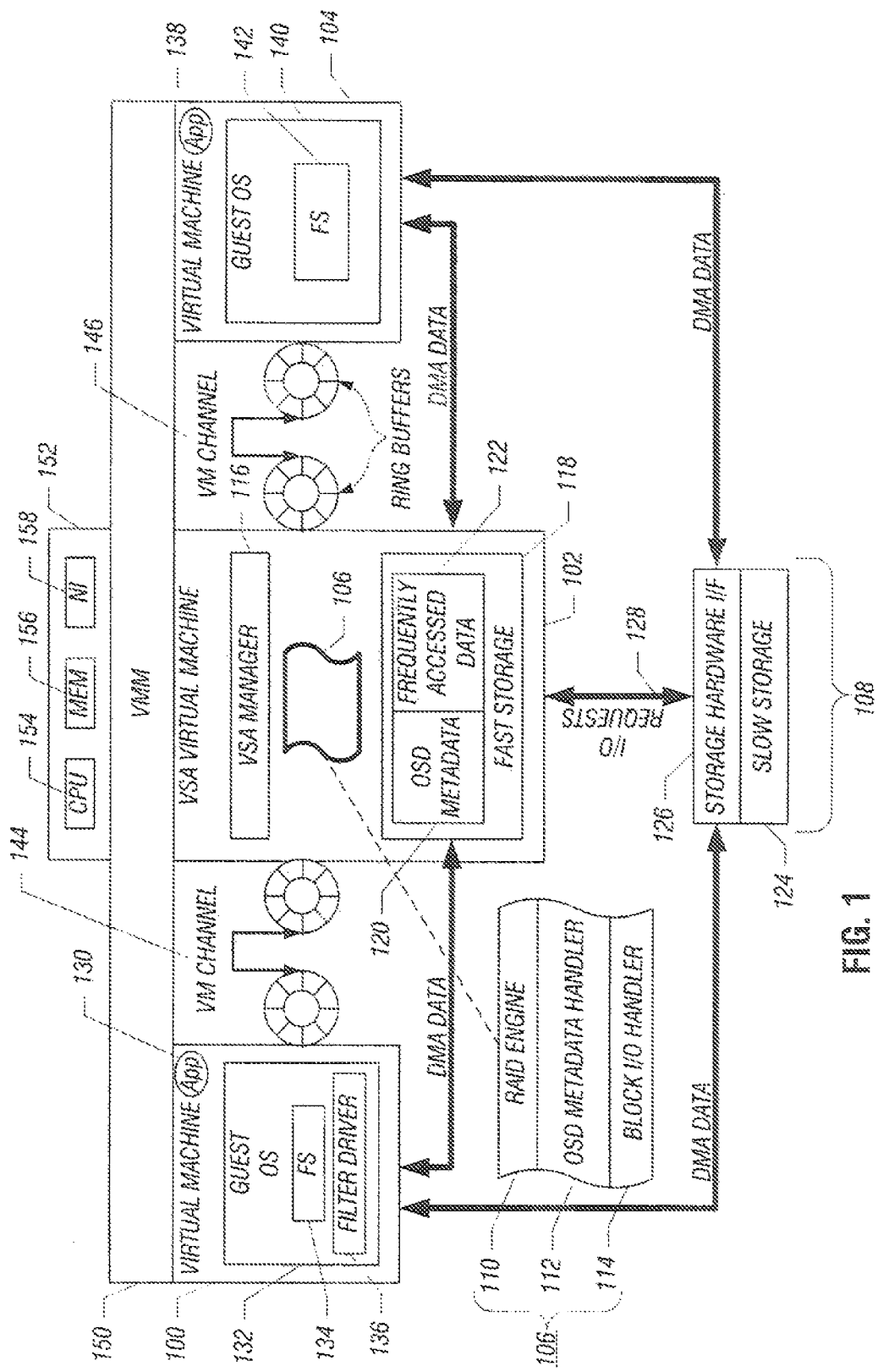
FIG. 1 is a block diagram of an exemplary system that includes virtual machines, in accordance with an embodiment.

In general, according to some embodiments, a system includes a storage subsystem and multiple virtual machines, where one of the multiple virtual machines (referred to as a "virtual storage appliance" or "VSA" virtual machine) is used to manage access of the storage subsystem. One or more other virtual machines are coupled over respective virtual machine channel(s) to the VSA virtual machine. These other virtual machine(s) is (are) able to issue object-level input/output (I/O) requests to the VSA virtual machine to access the storage subsystem. The object-level I/O requests can be according to a standard protocol that defines file- and directory-level commands for accessing storage devices of the storage subsystem. One such standard protocol is the Object-based Storage Devices (OSD) protocol, as defined by the Storage Networking Industry Association (SNIA). By using object-level I/O requests that are defined by a standard protocol, implementation of the system is made more efficient since components such as operating systems that run within virtual machines do not have to be modified.

A "virtual machine" refers to some partition or segment (made up of software and/or hardware) of a physical machine (e.g., a computer, a network of computers, etc.) that is provided to virtualize or emulate a physical machine. From the perspective of a user, a virtual machine looks just like a physical machine. According to some embodiments, a virtual machine includes one or more software applications, an operating system (referred to as a "guest" operating system), and one or more device drivers (which are typically part of the operating system). The guest operating systems that are part of corresponding virtual machines can be different from each other (for example, the different operating systems can be a Linux operating system, a Unix operating system, a WINDOWS® operating system, and so forth). The provision of different guest operating systems in different virtual machines allows software applications designed for different operating systems to execute in the different virtual machines. The virtual machines can all be implemented on one physical machine, or alternatively, across multiple physical machines.

An "object-level I/O request" refers to a request submitted by a requesting entity to access (read or write) content of a storage subsystem, where the request specifies the access of a file, a directory, or other file hierarchy. An object-level I/O request is contrasted to a block-level I/O request that specifies access of blocks of data, rather than files. A "block" of data that is stored in the storage subsystem merely refers to some collection of data in the storage subsystem, with the storage subsystem typically being unaware of which specific files (or directories or other file hierarchies) the blocks belong to. Note that a file (or directory or other file hierarchy) can include multiple blocks (or just one block). A "file" is an element of data storage in a file system. A "file system" refers to a mechanism used for storing and organizing stored data. An "object" refers to any one of a file, directory, or file hierarchy—an object is a storage entity that is at a higher level than blocks that are used in the storage subsystem.

A "virtual machine channel" refers to some shared resource that enables virtual machines to communicate with each other. In some embodiments, a virtual machine channel can refer to a shared data structure within system memory accessible by the virtual machines. Typically, conventional virtual machine channels support just block-level I/O requests for accessing a storage subsystem. However, in accordance with some embodiments, mechanisms are provided to enable object-level I/O requests to be submitted over virtual machine channels to allow requesting entities to access the storage subsystem. The requesting entity may be an application or an operating system running in a particular virtual machine.

In one embodiment, object-level I/O requests that are communicated over virtual machine channels to the VSA virtual machine are according to the Object-based Storage Devices (OSD) protocol, as defined by the Storage Networking Industry Association (SNIA). The OSD protocol allows for access of storage objects, where each storage object contains data that has been determined to be logically related. The OSD protocol defines file- and directory-level commands that are encoded as SCSI (small computer system interface) commands. Although reference is made to OSD in this discussion, it is noted that other standard protocols that define other types of object-level requests for accessing storage subsystems can be used in other embodiments.

FIG. 1 illustrates an example arrangement that includes virtual machines 100, 102, and 104. The virtual machine 102, which manages the access of data in a storage subsystem 108, is referred to as a virtual storage appliance (VSA) virtual machine. Note that the label "VSA" attached to the virtual machine 102 is provided for purposes of example. In other implementations, other labels can be used for describing the virtual machine 102.

The VSA virtual machine 102 includes a collection 106 of control modules that are used for accessing a storage subsystem 108. The collection 106 of control modules includes a RAID (redundant array of inexpensive disks) engine 110, which implements RAID functionalities to enable storage of data using RAID techniques. There are several different RAID levels, including RAID 1, RAID 5, RAID 6, and so forth. The RAID 1 configuration provides a mirrored set without parity, in which two groups of physical storage devices are provided, where one of the groups of physical storage devices is used to mirror (replicate) the other group of physical storage devices. The RAID 5 configuration provides a striped set with distributed parity, which includes at least three groups (up to five groups) of physical storage devices. RAID 5 is tolerant to failure of one of the groups of physical storage devices. RAID 6 is similar to RAID 5 but with dual parity to provide fault tolerance of up to two groups of physical storage devices.

The collection 106 of control modules also includes an OSD metadata handler 112, which is used to process metadata associated with different objects (e.g., size of files, location of files, organization of files into directories, and so forth). Moreover, the collection 106 includes a block I/O handler 114, which is capable of processing block-level I/O requests received over a virtual machine channel (such as from another virtual machine). In accordance with some embodiments, the VSA virtual machine 102 is able to handle both object-level I/O requests and block-level I/O requests. In different implementations, however, the VSA virtual machine 102 can be configured to accept just object-level I/O requests.

The VSA virtual machine 102 also includes a VSA manager 116, which is able to perform management tasks with respect to the VSA virtual machine 102. In addition, the VSA virtual machine 102 includes fast storage 118, which can be implemented with relatively fast storage device(s), such as system memory that includes dynamic random access memories (DRAMs), static random access memories (SRAMs), or other types of integrated circuit memory devices. The fast storage 118 can be used to store OSD metadata 120 and frequently-accessed data 122 to improve performance of the VSA virtual machine 102. The fast storage 118 can be a non-volatile memory such as battery-backed system memory or other non-volatile memory. As used here, "fast" storage refers to storage that has a faster access speed than slower storage that is present in the system. By storing OSD metadata 120 and frequently-accessed data 122 in the fast storage 118, the VSA virtual machine 102 is able to obtain such data in response to I/O requests without having to go to a relatively slow storage 124 of the storage subsystem 108. Note that the relatively slow storage 124 can be implemented with disk-based storage devices, such as magnetic or optical disk storage devices.

The storage subsystem 108 also includes a storage hardware interface 126, which is coupled over a link 128 to the VSA virtual machine 102. The VSA virtual machine 102 is able to issue I/O requests over the link 128 to access (read or write) data in the storage subsystem 108.

The virtual machine 100 includes one or more software applications 130 and a guest operating system 132. The guest operating system 132 includes file system logic 124 (which is part of a file system) to perform access control and other management and storage tasks with respect to user data.

In the exemplary implementation depicted in FIG. 1, it is assumed that the guest operating system 132 is unable to support object-level I/O requests. Rather, the guest operating system 132 supports block-level I/O requests. To enable the virtual machine 100 to submit object-level I/O requests to the VSA virtual machine 102, a file system filter driver 136 according to an embodiment is provided in the virtual machine 100, where the file system filter driver 136 can be part of the guest operating system 132. The file system filter driver 136 converts file system file-level I/O requests that are unique to a file system (e.g., Windows NTFS, Linux EXT3, etc.) by the guest operating system 132 to an object-level, such as OSD, I/O requests before submitting such requests to the VSA virtual machine 102.

The other virtual machine 104 depicted in FIG. 1 also includes one or more software applications 138 and a guest operating system 140. The guest operating system 140 includes file system logic 142. In this example, the guest operating system 140 is assumed to support a standard object-level I/O requests, such as OSD, across the virtual machine channel, such that a file system filter driver similar to filter driver 136 is not provided in the virtual machine 104. In other words, the guest operating system 140 is able to send object-level I/O requests to the VSA virtual machine 102.

A first virtual machine channel 144 is provided between the virtual machine 100 and VSA virtual machine 102, and a second virtual machine channel 146 is provided between the virtual machine 104 and VSA virtual machine 102. In one exemplary embodiment, each of the virtual machine channels 144 and 146 is implemented with ring buffers, which are part of system memory (e.g., system memory 156 shown in FIG. 1). A ring buffer is a circular buffer including entries that are pointed to by a pointer that successively points to the different entries for storage new information in the circular buffer. Once the circular buffer becomes full, the pointer again points to the first entry of the circular buffer.

A virtual machine submits an I/O request to a ring buffer, and the VSA virtual machine 102 in turn retrieves such requests from the ring buffer. In other implementations, other types of data structures maintained in system memory 156 can be used to implement a virtual machine channel. As yet a further alternative, the virtual machine channel can be implemented using a system bus.

The system depicted in FIG. 1 also includes a virtual machine monitor (VMM) 150, which manages the sharing of hardware resources 152 of the system by the virtual machines 100, 102, and 104. The hardware resources 152 include one or more central processing units (CPUs) 154, the system memory 156, a network interface 158, and so forth. Note that the storage subsystem 108 can also be considered to be part of the hardware resources 152.

In some implementations, actual data transfer (e.g., data transfer in response to a read request or data transfer to communicate write data) is not performed through a virtual machine channel (144 or 146) but through DMA (direct memory access) transactions that are initiated by the storage devices that are part of the storage subsystem 108. The DMA transactions initiated by the storage devices of the storage subsystem 108 cause the data to be transferred directly to/from the memory associated with the corresponding guest operating system of the requesting virtual machine.

FIG. 1 assumes that the virtual machines 100, 102, and 104 are implemented in one physical machine, such as a storage server computer. It is noted that the virtual machines depicted in FIG. 1 can actually be on multiple physical machines, in a different embodiment.

The arrangement depicted in FIG. 1 can be used in various types of network topologies, such as a storage area network (SAN) topology, a iSCSI (Internet SCSI) network topology, or an SAS (serial attached SCSI) network topology. In one example, the VSA virtual machine 102 of FIG. 1 can be implemented on a back-end server, and a requesting virtual machine can be implemented on a front-end server. The front-end server can issue object-level I/O requests over a network connection, such as Ethernet or fiber channel, to the back-end server that includes the VSA virtual machine 102.

Figure 2:
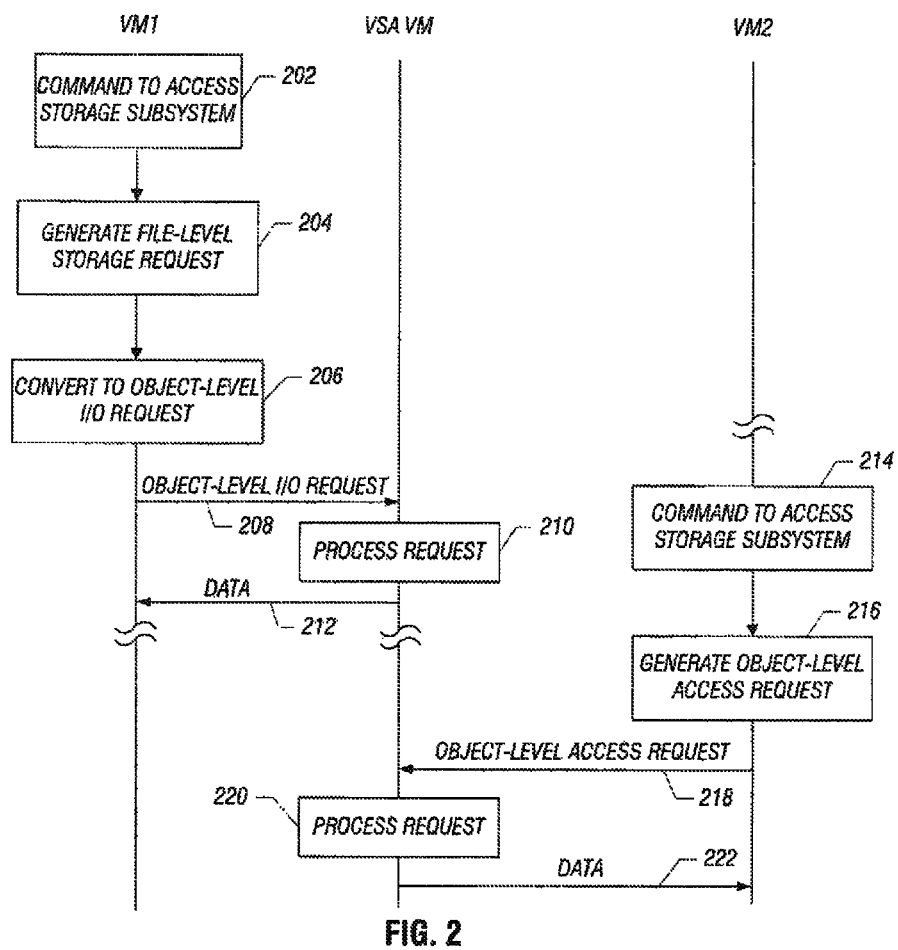
FIG. 2 is a flow diagram of a process of accessing a storage system using object-level input/output requests from virtual machines, in accordance with an embodiment.

FIG. 2 is a message flow diagram of an exemplary process of accessing data in the storage subsystem 108 (FIG. 1) in accordance with an embodiment. The three entities depicted in FIG. 2 include VM1 and VM2 (virtual machines 100 and 104, respectively), and VSA VM (102 in FIG. 1).

It is assumed that VM1 has received a command (at 202) to access the storage subsystem 108, where the command may have been received from a software application (130 in FIG. 1). In response to the request, the guest operating system 132 generates (at 204) a file system file-level I/O request, which is converted (at 206) to one or more object-level I/O requests by the file system filter driver 136 (FIG. 1). The one or more object-level I/O requests are then sent (at 208) to the VSA VM, which processes the request(s) and returns data (assuming that the request is a read request) (at 212) to VM1. Note that the data transfer at 212 is performed using a DMA transfer, in one exemplary implementation.

Continuing on with the example, it is assumed that VM2 has received (at 214) a command to access the storage subsystem 108. In response to such command, the guest operating system 140 of VM2 generates (at 216) an object-level I/O request, which is then sent (at 218) to the VSA VM. Similar processing is performed by the VSA VM to process (at 220) the object-level I/O request(s) from VM2. Requested data (if the request is a read) is sent (at 222) from the VSA VM to VM2.

The use of object-level I/O requests, such as according to the OSD protocol, enables the effective implementation of various advanced techniques to improve reliability and to improve I/O performance. Such advanced techniques include implementation of RAID 5 or RAID 6 writes of a file that is fully striped across storage devices of the storage subsystem 108, such that read-modify-write transactions can be avoided. Note that block-level I/O writes of data in a RAID 5 or RAID 6 architecture may involve read-modify-write transactions, which consumes additional I/O accesses. Avoiding read-modify-write transactions can improve performance for RAID 5 and RAID 6 writes by up to a factor of 4.

Another advanced technique that can be supported with object-level I/O requests is that copy-on-write can be implemented. When a new file is written to the storage subsystem 108, the new file can be stored in a new contiguous section of a storage device, such as a disk storage medium, instead of overwriting old data. Copy-on-write in this case can gather multiple writes into one sequential write to a contiguous section of the disk storage medium, which reduces seek time associated with disk-based storage devices. Moreover, old data is not corrupted, such that in the event of failure, copies of old data can be retrieved to recover from corruption of data.

Another advanced technique that can be implemented is to use different RAID levels depending on attributes of files to maintain performance and redundancy quality of service. Note that certain files (for certain applications having certain quality of service) may benefit from using an enhanced RAID level, such as RAID 5, while other files may benefit from using a lower RAID level, such as RAID 1. Thus, the RAID engine 110 in FIG. 1 of the VSA virtual machine 102 is able to implement different RAID levels for different types of files.

Instructions of software described above (including the collection 106 of modules, VSA manager 116, guest operating systems 132 and 140, and so forth of FIG. 1) are loaded for execution on a processor (such as one or more CPUs 154 in FIG. 1). The processor includes microprocessors, microcontrollers, processor modules or subsystems (including one or more microprocessors or microcontrollers), or other control or computing devices. As used here, a "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
a storage subsystem;
a first virtual machine comprising a RAID (redundant array of inexpensive disks) engine to manage access of the storage subsystem, the first virtual machine including a first operating system; and
a second virtual machine including a second operating system and coupled by a virtual machine channel to the first virtual machine, the second virtual machine including a file system filter driver to convert a file-level input/output (I/O) request to an object-level I/O request, wherein the file-level I/O request is unique to a specific file system, and the object-level I/O request is according to an Object-based Storage Devices (OSD) protocol and is different from a block-level I/O request, and the second virtual machine to issue the object-level I/O request into a ring buffer of the virtual machine channel to access data in the storage subsystem, and
wherein the first virtual machine is to retrieve the object-level I/O request from the ring buffer, and access data in the storage subsystem in response to the retrieved object-level I/O request.

2. The system of claim 1, further comprising a third virtual machine coupled over a second virtual machine channel including a ring buffer to the first virtual machine, wherein the third virtual machine has software to issue another object-level I/O request to the first virtual machine over the second virtual machine channel.

3. The system of claim 2, wherein the second operating system of the second virtual machine is different from a third operating system of the third virtual machine.

4. The system of claim 1, further comprising a third virtual machine having a third operating system to generate object-level I/O requests without using a file system filter driver that converts file-level I/O requests to object-level I/O requests.

5. The system of claim 1, wherein the RAID engine is to implement RAID in the storage subsystem.

6. The system of claim 5, wherein the first virtual machine further includes a block I/O handler to handle a block-level I/O request for data in the storage subsystem.

7. The system of claim 5, wherein the RAID engine is configured to implement different RAID levels for different types of files.

8. The system of claim 1, further comprising a non-volatile fast storage, wherein the fast storage is used to store metadata and frequently accessed data.

9. The system of claim 1, further comprising:
a third virtual machine including a third operating system, the third virtual machine to issue a block-level I/O request over a second virtual machine channel to the first virtual machine,
wherein the first virtual machine further includes a block I/O handler to process the block-level I/O request issued by the third virtual machine.

10. A method of managing access of a storage subsystem, comprising:
providing a first virtual machine including a first operating system and that manages access of the storage subsystem;
converting, by a file system filter driver in a second virtual machine that includes a second operating system, a file-level input/output (I/O) request to an object-level I/O request, the object-level I/O request being different from a block-level I/O request, wherein the file-level I/O request is unique to a specific file system, wherein the object-level I/O request is according to an Object-based Storage Devices (OSD) protocol, and the second operating system of the second virtual machine does not support the object-level I/O request according to the OSD protocol; and
sending the object-level I/O request over a virtual machine channel from the second virtual machine to the first virtual machine to access data in the storage subsystem.

11. The method of claim 10, further comprising running a RAID (redundant array of inexpensive disks) engine in the first virtual machine to implement a RAID architecture in the storage subsystem.

12. The method of claim 11, further comprising the RAID engine providing different RAID levels for different types of files.

13. The method of claim 10, further comprising:
processing, by the first virtual machine, the object-level I/O request to access data in the storage subsystem;
a third virtual machine, which includes a third operating system, sending a block-level I/O request over another virtual machine channel to the first virtual machine; and
processing, by the first virtual machine, the block-level I/O request sent by the third virtual machine to access data in the storage subsystem.

14. The method of claim 10, further comprising providing a virtual machine monitor to manage sharing of hardware resources of a system containing the first and second virtual machines.

15. The method of claim 10, wherein the virtual machine channel includes a ring buffer, wherein sending the object-level I/O request comprises the second virtual machine submitting the object-level I/O request to the ring buffer, and the first virtual machine retrieving the I/O request form the ring buffer.

16. An article comprising at least one non-transitory computer-readable storage medium containing instructions that when executed cause a computer to:
execute a RAID (redundant array of inexpensive disks) engine in a first virtual machine to manage access of data in a storage subsystem, the first virtual machine including a first operating system;
convert, by a file system filter driver in a second virtual machine that includes a second operating system, a file-level input/output (I/O) request to an object-level I/O request, wherein the file-level I/O request is unique to a specific file system, and the object-level I/O request is according to an Object-based Storage Devices (OSD) protocol and is different from a block-level I/O request;
submit, by the second virtual machine, the object-level I/O request into a ring buffer of a virtual machine channel between the first and second virtual machines, wherein the object-level I/O request is to access data in the storage subsystem; and
retrieve, by the first virtual machine, the object-level I/O request from the ring buffer, and access data in the storage subsystem in response to the retrieved object-level I/O request.

17. The article of claim 16, wherein the instructions when executed cause the computer to further:
submit, by a third virtual machine including a third operating system, a block-level I/O request into a ring buffer of a second virtual machine channel between the first and third virtual machines; and
retrieve, by the first virtual machine, the block-level I/O request from the ring buffer of the second virtual machine channel, and access data in the storage subsystem in response to the retrieved block-level I/O request.

* * * * *